United States Patent
Fahim et al.

(10) Patent No.: US 9,606,925 B2
(45) Date of Patent: Mar. 28, 2017

(54) METHOD, APPARATUS AND SYSTEM FOR OPTIMIZING CACHE MEMORY TRANSACTION HANDLING IN A PROCESSOR

(71) Applicant: Intel Corporation, Santa Clara, CA (US)

(72) Inventors: Bahaa Fahim, Santa Clara, CA (US); Yen-Cheng Liu, Portland, OR (US); Vedaraman Geetha, Fremont, CA (US); Jeffrey D. Chamberlain, Tracy, CA (US); Min Huang, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 14/669,248

(22) Filed: Mar. 26, 2015

(65) Prior Publication Data

US 2016/0283382 A1 Sep. 29, 2016

(51) Int. Cl.
*G06F 12/00* (2006.01)
*G06F 12/08* (2016.01)
*G06F 13/00* (2006.01)
*G06F 13/28* (2006.01)

(52) U.S. Cl.
CPC ...... *G06F 12/0855* (2013.01); *G06F 12/0831* (2013.01); *G06F 2212/27* (2013.01); *G06F 2212/621* (2013.01)

(58) Field of Classification Search
CPC ............. G06F 12/0855; G06F 12/0831; G06F 2212/621; G06F 2212/27
See application file for complete search history.

(56) References Cited

U.S. PATENT DOCUMENTS

| 5,848,287 | A | * | 12/1998 | Tran | G06F 9/30167 708/233 |
| 6,049,851 | A | * | 4/2000 | Bryg | G06F 12/0831 711/141 |
| 6,145,059 | A | * | 11/2000 | Arimilli | G06F 12/0831 711/119 |
| 6,631,447 | B1 | * | 10/2003 | Morioka | G06F 12/0815 711/118 |

(Continued)

OTHER PUBLICATIONS

U.S. Appl. No. 14/070,864, filed Nov. 4, 2013, entitled "A Method, Apparatus and System for Handling Cache Misses in a Processor," by Bahaa Fahim.

(Continued)

*Primary Examiner* — Mark Giardino, Jr.
(74) *Attorney, Agent, or Firm* — Trop, Pruner & Hu, P.C.

(57) ABSTRACT

In one embodiment, a processor includes a caching home agent (CHA) coupled to a core and a cache memory and includes a cache controller having a cache pipeline and a home agent having a home agent pipeline. The CHA may: receive, in the home agent pipeline, information from an external agent responsive to a miss for data in the cache memory; issue a global ordering signal from the home agent pipeline to a requester of the data to inform the requester of receipt of the data; and report issuance of the global ordering signal to the cache pipeline, to prevent the cache pipeline from issuance of a global ordering signal to the requester. Other embodiments are described and claimed.

20 Claims, 9 Drawing Sheets

(56) References Cited

U.S. PATENT DOCUMENTS

| | | |
|---|---|---|
| 7,512,741 B1 | 3/2009 | Batson et al. |
| 7,937,534 B2 | 5/2011 | Maddukkarumukumana |
| 8,169,850 B2 | 5/2012 | Sistla et al. |
| 8,984,228 B2 | 3/2015 | Liu et al. |
| 2005/0044324 A1* | 2/2005 | Rashid .................... H04L 49/00 711/122 |
| 2006/0149885 A1* | 7/2006 | Sistla .................... G06F 12/082 710/310 |
| 2009/0089510 A1* | 4/2009 | Lee ..................... G06F 12/0831 711/141 |
| 2012/0047333 A1 | 2/2012 | Kottapalli et al. |
| 2013/0151782 A1 | 6/2013 | Liu et al. |
| 2014/0052905 A1* | 2/2014 | Lih ..................... G06F 12/0831 711/105 |
| 2016/0055085 A1* | 2/2016 | Salisbury ............ G06F 12/0831 711/146 |

OTHER PUBLICATIONS

Intel Corporation, "An Introduction to the Intel Quickpath Interconnect," Jan. 2009, 22 pages.

\* cited by examiner

METHOD, APPARATUS AND SYSTEM FOR OPTIMIZING CACHE MEMORY TRANSACTION HANDLING IN A PROCESSOR

TECHNICAL FIELD

This disclosure pertains to computing systems, and more particularly to cache management in such systems.

DETAILED DESCRIPTION

Figure 1:
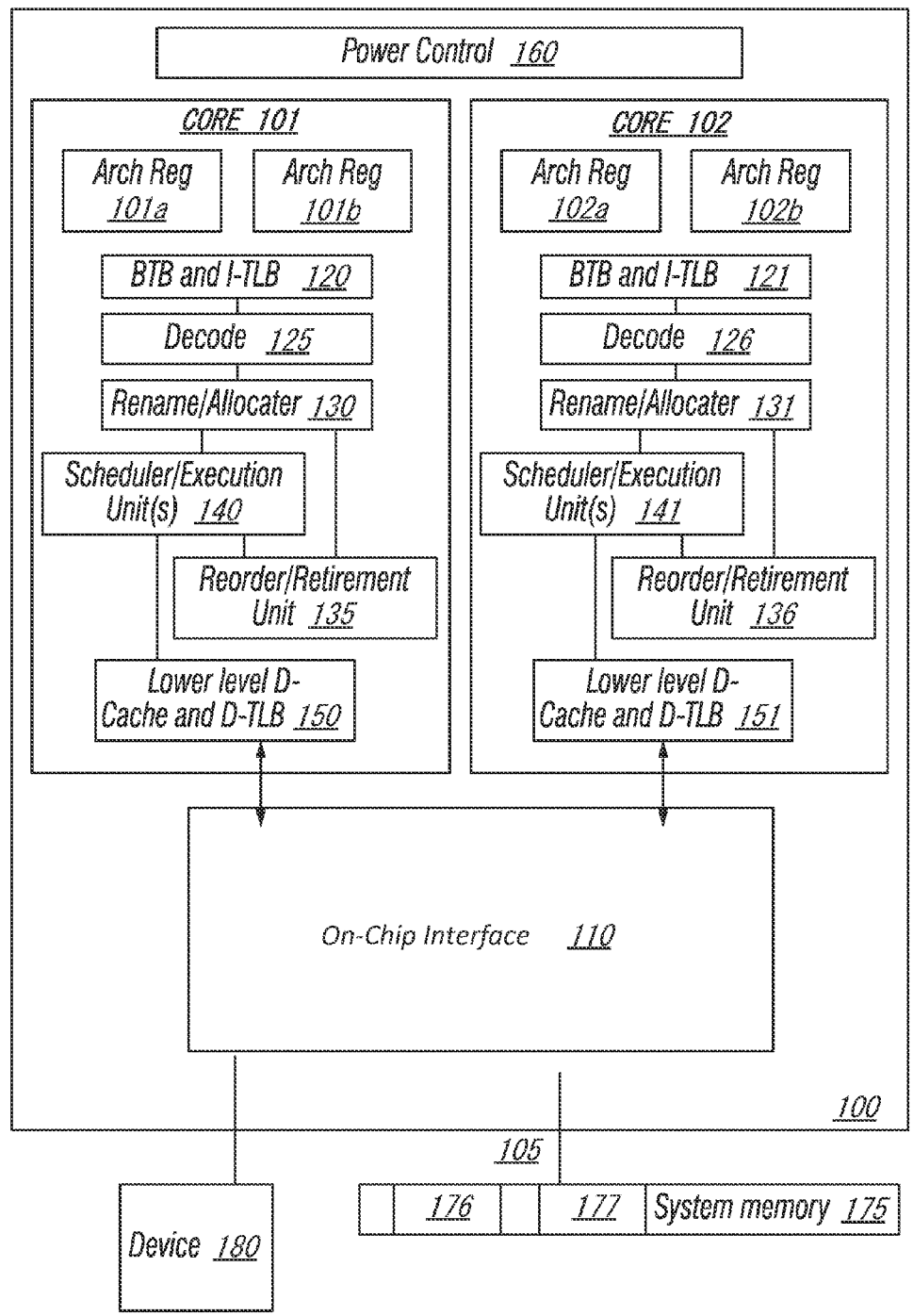
FIG. 1 is a block diagram for a computing system including a multicore processor.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
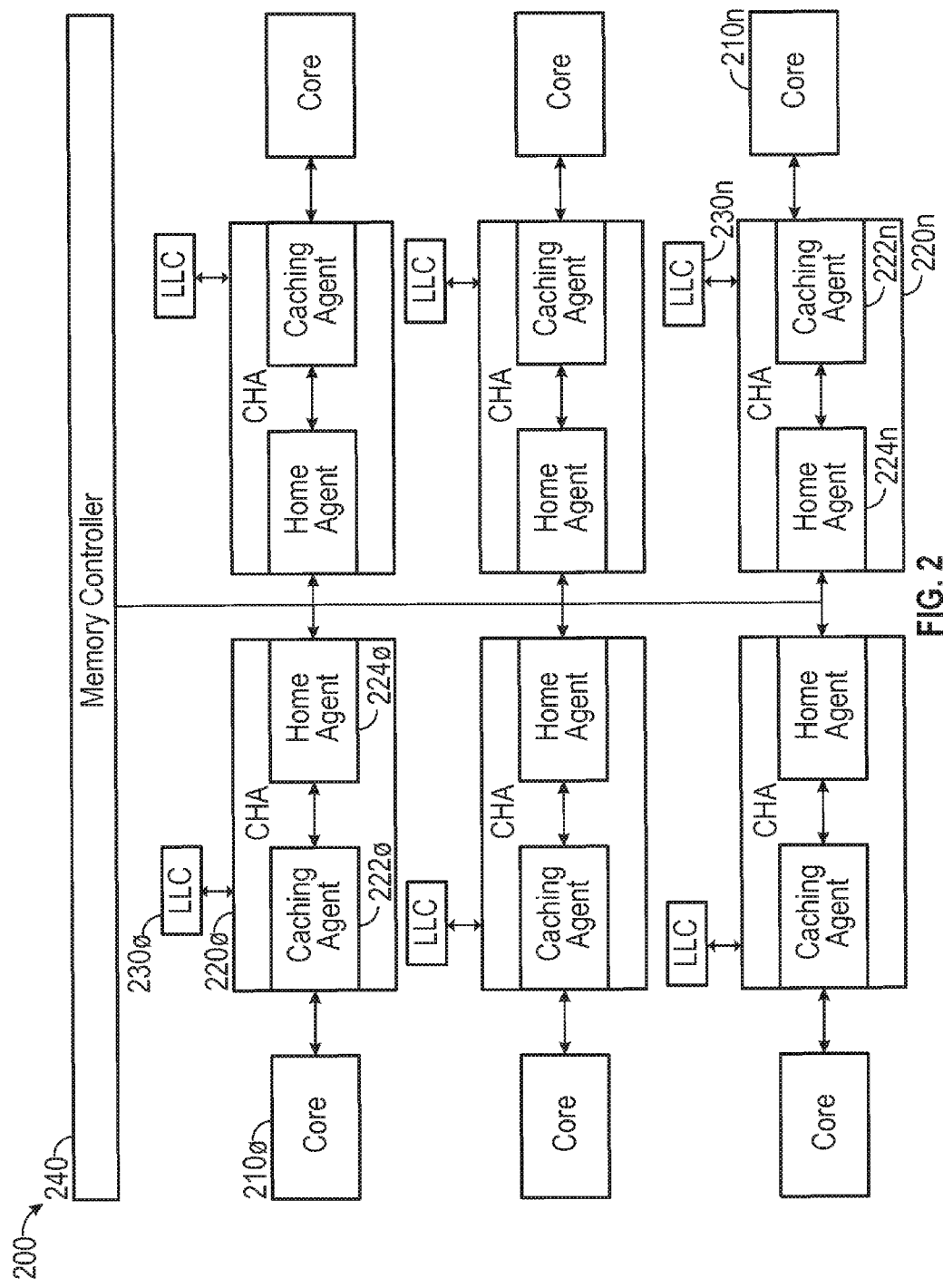
FIG. 2 is a block diagram of a multicore processor in accordance with an embodiment of the present invention.

Referring now to FIG. 2, shown is a block diagram of a multicore processor in accordance with an embodiment of the present invention. As shown in FIG. 2, processor 200 includes a plurality of cores $210_0$-$210_n$. Each of these cores may be homogeneous cores or one or more of the cores may be of a heterogeneous design. For example, some of the cores may be relatively simple in-order cores, while others of the cores may be out-of-order cores. In a given multicore processor implementation, each core 210 may include one or more levels of a cache hierarchy. For example, in an embodiment each core 210 may include private cache memories, including level 1 (L1) and level 2 (L2) cache memories. In embodiments, such cache memories may be maintained non-inclusively. That is, information present in one or more of these cache memories may not be present in higher levels of a cache hierarchy, such as a shared cache to which cores may couple. Each core is coupled to a combined caching agent and home agent, referred to herein in as a caching home agent (CHA) 220. In general CHA 220 serves as the local coherence and cache controller (via cache controller 222, also referred to herein as a caching agent), and also serves (via home agent 224) as the global coherence and memory controller interface.

In an embodiment CHA 220 may be of a distributed design, including each of the distributed CHAs $210_0$-$210_n$ associated with one of the cores. As seen, each CHA 220 includes a caching agent 222 and a home agent 224. In general, caching agent 222 is a cache controller that includes a cache pipeline and/or other logic that is associated with a corresponding portion of a cache memory, such as a distributed portion of a last level cache (LLC 230). In the embodiment shown, each CHA 220 couples to a distributed portion of LLC $230_0$-$230_n$. More particularly, each individual caching agent 222 may interact with a corresponding LLC portion or slice 230. While shown as direct connections, understand that the various interconnections shown in FIG. 2 may be of a ring-based interconnect, in some embodiments.

Still with reference to FIG. 2, home agent 224 includes a home agent pipeline, and is configured to protect a given portion of a memory such as a system memory coupled to the processor. To enable communications with such memory, each of CHAs 220 is coupled to a memory controller 240 which in an embodiment is an internal memory controller of the processor that provides an interface to a system memory such as a given type of dynamic random access memory (DRAM).

Although particular components are shown in FIG. 2, understand that a processor such as a multicore processor may include other components including other non-core circuitry, commonly referred to as an uncore. Such circuitry may include an interconnect fabric, interfaces to off-chip devices, and a power control unit among many other components such as an internal voltage regulator. However, for ease of illustration such additional components of the processor are not shown. Furthermore, understand that the components shown, including the CHA, its constituent components, the cores and the memory controller themselves are formed of a variety of different logic blocks and circuits, details of which are not shown so as not to obscure the discussion herein.

Given the distributed and combined caching home agent of the FIG. 2 processor, embodiments may modify memory request protocols to optimize flows to reduce latency and improve performance.

Figure 3:
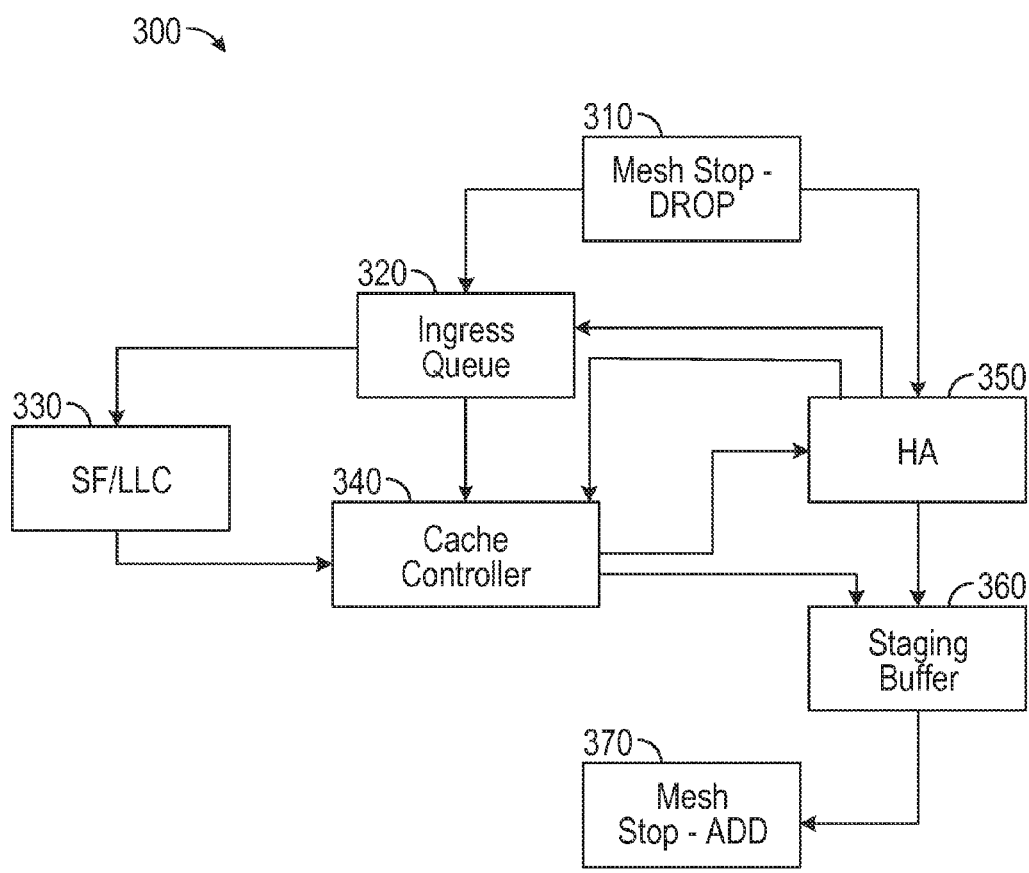
FIG. 3 is a block diagram of a caching home agent in accordance with an embodiment of the present invention.

Referring now to FIG. 3, shown is a block diagram of further details of a CHA in accordance with an embodiment of the present invention. As shown in FIG. 3, CHA 300 is a representation of components of one CHA, which may be one of many distributed CHAs that collectively form a coherent combined caching home agent for a processor. In general, CHA 300 includes various components that couple between interconnect interfaces. Specifically, a first interconnect stop 310 provides inputs to CHA 300 while a second interconnect stop 370 provides outputs from the CHA. In an embodiment, a processor may include an interconnect fabric such as a mesh interconnect so that stops 310 and 370 are configured as mesh stops to respectively receive incoming information and to output outgoing information.

As illustrated, first interconnect stop 310 is coupled to an ingress queue 320 that may include one or more entries to receive incoming requests and pass them along to appropriate portions of the CHA. In the implementation shown, ingress queue 320 is coupled to a portion of a cache memory hierarchy, specifically a snoop filter and a last level cache (LLC) 330. In general, a snoop filter may be a distributed portion of a directory that includes a plurality of entries that store tag information used to determine whether incoming requests hit in a given portion of a cache memory. In an embodiment, the snoop filter includes entries for a corresponding L2 cache memory to maintain state information associated with the cache lines of the L2 cache. Note however that the actual data stored in this L2 cache is not present in the snoop filter, as the snoop filter is configured only to store the state information associated with the cache lines. In turn, LLC 330 may be a slice or other portion of a distributed last level cache and may include a plurality of entries to store tag information, cache coherency information and data as a set of cache lines. In some embodiments, the snoop filter may be implemented at least in part via a set of entries of the LLC including tag information.

Cache controller 340 in turn may include various logic to perform cache processing operations. In general, cache controller 340 may be configured as a pipelined logic (also referred to herein as a cache pipeline) that further includes a tracker implemented as a table of requests (TOR), which may include various entries to store incoming requests to be processed. Note the cache controller 340 performs various processing on memory requests, including various preparatory actions that proceed through a pipelined logic of the cache controller to determine appropriate cache coherency operations. As further seen, snoop filter/LLC 330 couples to cache controller 340. As will be described herein, response information may be communicated via this coupling based on whether a lookup request (received from ingress queue 320) hits (or not) in the snoop filter/LLC. In general, cache controller 340 is responsible for local coherency and interfacing with the snoop filter and LLC, and may include one or more trackers (e.g., a TOR) each having a plurality of entries to store pending requests.

As further shown, cache controller 340 also couples to a home agent 350 which may include a pipelined logic (also referred to herein as a home agent pipeline) and other structures used to interface with and protect a corresponding portion of a system memory. In general, home agent 350 may include one or more trackers each having a plurality of entries to store pending requests and to enable these requests to be processed through a memory hierarchy. For read requests that miss the snoop filter/LLC, home agent 350 registers the request in a tracker, determines if snoops are to be spawned, and/or memory reads are to be issued based on a number of conditions. In an embodiment, the cache memory pipeline is roughly 9 clock cycles, and the home agent pipeline is roughly 4 clock cycles. This allows CHA 300 to produce a minimal memory/cache miss latency using an integrated home agent.

Next as seen in FIG. 3, outgoing requests from cache controller 340 and home agent 350 couple through a staging buffer 360 and to interconnect stop 370. In an embodiment, staging buffer 360 may include a selection logic to select between requests from the two pipeline paths. In an embodiment, cache controller 340 generally may issue remote requests/responses, while home agent 350 may issue memory read/writes and snoops/forwards.

With the arrangement shown in FIG. 3, first interconnect stop 310 may provide incoming snoop responses or memory responses (e.g., received from off-chip) to home agent 350. Via coupling between home agent 350 and ingress queue 320, home agent completions may be provided to the ingress queue. In addition, to provide for optimized handling of certain memory transactions as described herein (updates such as updates to snoop filter entries), home agent 350 may further be coupled to cache controller 340 via a bypass path, such that information for certain optimized flows can be provided to a point deep in the cache pipeline of cache controller 340. Note also that cache controller 340 may provide information regarding local misses directly to home agent 350. Although shown at this high level in the embodiment of FIG. 3, understand the scope of the present invention is not limited in this regard.

Figure 4:
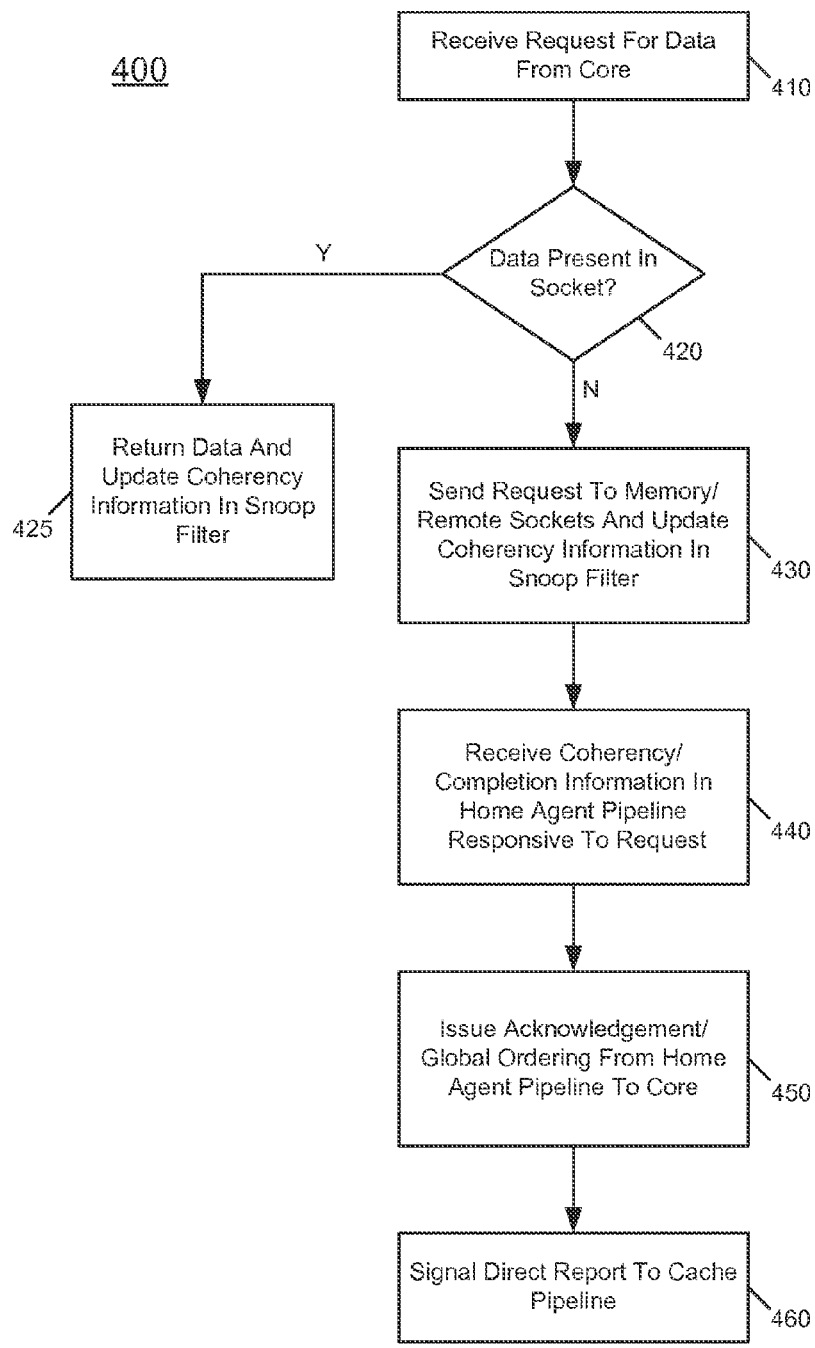
FIG. 4 is a flow diagram of a method for optimizing processing in a caching home agent in accordance with one embodiment of the present invention.

Referring now to FIG. 4, shown is a flow diagram of a method for optimizing processing in a caching home agent in accordance with an embodiment of the present invention. As shown in FIG. 4, method 400 may be performed by logic of a CHA as described herein, such as hardware logic and/or combinations of hardware logic, software and/or firmware. More specifically, method 400 may be used to optimize certain processing flows within the CHA, such that the illustrated activity may be handled directly by the home agent pipeline more efficiently than by handling using both the home agent pipeline and the cache pipeline, reducing the overall number of passes or traversals to occur in the two pipelines. This optimized handling described in FIG. 4 is with regard to miss processing, e.g., for write and read misses, where requested data is not present in a LLC (and further is not present in other cache memories of an on-chip cache hierarchy).

In the embodiment shown in FIG. 4, method 400 begins by receiving a core request for data (block 410). This core request is for a read or write operation for requested data that is not present in a private, e.g., non-inclusive cache memory of the core (e.g., a Level 1 or Level 2 cache). Next, control passes to diamond 420 to determine whether the requested data is present in the socket, namely the processor package including the multicore processor. This determination may be based on access to the LLC, as well as based on on-chip snoop processing. If it is determined that the requested data is present, control passes to block 425 where the data is returned to the requester and coherency information is updated in a snoop filter.

Otherwise, the request is sent to memory and/or remote sockets such as other multicore processors of a multiprocessor system (block 430). Note that this request may be sent via the home agent pipeline. In addition, snoop filter coherency information also may be updated at this point, namely at the request stage. In an embodiment, this snoop filter coherency update may be realized by sending information regarding the request from the home agent pipeline to the cache agent pipeline to enable the cache agent pipeline to update a corresponding entry of the snoop filter. For example, the snoop filter entry can be updated to identify a coherency state associated with the request (e.g., shared, exclusive, modified or so forth). Still further, the state can be updated to identify that the requested data is in transit.

Still referring to FIG. 4, at a later time the requested data is returned to the multicore processor. More specifically, the incoming data may be received by way of a completion message including the requested data and is provided to the CHA, and more specifically to the home agent pipeline. Thus as shown, at block 440 coherency and/or completion information is received in this home agent pipeline. Control next passes to block 450 where an acknowledgement/global ordering (GO) event may be signaled or issued directly from the home agent pipeline to the requester core, to indicate that the request is completed. Of course also within the home agent pipeline, the data of this completion message may be provided to an appropriate destination, e.g., an LLC slice associated with the core. Note that optimized processing thus is realized, in that the home agent pipeline, in a single traversal through the home agent pipeline, receives and handles this completion message, without sending the completion itself to the cache pipeline. That is, without the optimized handling described in FIG. 4, communication of the completion message to the cache pipeline would occur and the cache pipeline would also process this completion message, via a traversal of the cache pipeline.

Still referring to FIG. 4, to enable the cache pipeline to update certain resources responsive to receipt of this completion message, the home agent pipeline may also at block 460 send a direct report signal to the cache pipeline. This direct report signal thus indicates to the cache pipeline that: (1) the home agent has sent a GO signal to the relevant core; and (2) the requested data has been received such that the cache pipeline can update the state of this read request, e.g., in an entry of the snoop filter of the cache pipeline.

As an example, different types of global ordering signals may be sent from the home agent pipeline to the requester. In some embodiments, the home agent pipeline may directly issue various global observation signals, write pull messages and/or completion messages directly to a requester (e.g., core) to offload cache pipeline activity. By this operation and the corresponding communication of a direct GO signal to the cache pipeline (to enable the cache pipeline to update state as appropriate), cache pipeline activity/overhead may be offloaded for these messages sent directly from the home agent pipeline to the core or other requester to optimize various read and write miss flows. Understand while shown at this high level in the embodiment of FIG. 4, many variations and alternatives are possible.

Figure 5:
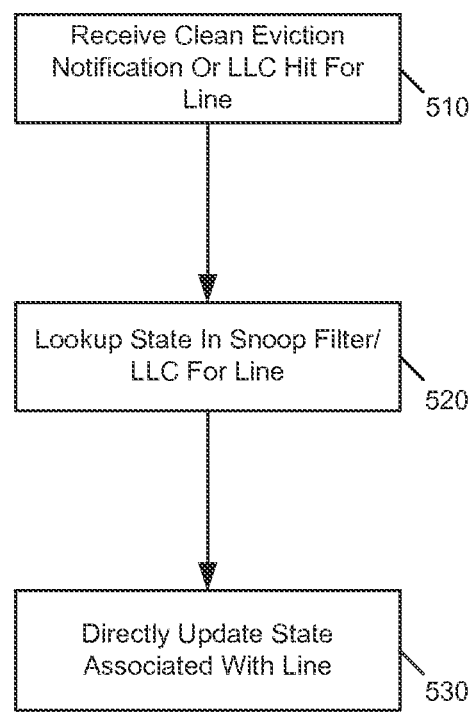
FIG. 5 is a flow diagram of a method for optimizing processing in a caching home agent in accordance with another embodiment of the present invention.

Referring now to FIG. 5, shown is a flow diagram of a method for optimizing processing in a caching home agent in accordance with another embodiment of the present invention. In the embodiment shown in FIG. 5, method 500 may be performed by logic of a CHA as described herein, such as hardware logic and/or combinations of hardware logic, software and/or firmware. More specifically, method 500 provides for optimized handling of CHA processing for situations where a request hits in a snoop filter and/or LLC. In such cases, a state update (for a coherency state of a line) can be performed without waiting for a return of data and thus the need for multiple traversals of a cache pipeline can be avoided.

As seen, method 500 begins by receiving a clean eviction notification or an LLC hit indication for a line within the cache memory, to provide an indication that a clean data line has been evicted from, e.g., a L2 cache (block 510). Next at block 520 the state of the corresponding line can be accessed in the snoop filter and LLC. Next at block 530 the state of the corresponding entries in the snoop filter and/or LLC is directly updated to identify this eviction/hit. This read then modify may occur in subsequent cycles of a single traversal of the cache pipeline to avoid multiple passes. That is, by way of this direct update within a single traversal of the cache pipeline, reduced resources are consumed, and the need to perform separate traversals through the cache pipeline for the initial lookup and then a second traversal for the update is avoided.

Note that the flow of method 500 may occur in the cache pipeline for an update to state of a snoop filter entry. More specifically, method 500 may be used to perform a Read Modify Write (RMW) update of state in a given snoop filter entry. Similarly, method 500 may occur to perform a similar RMW update for the LLC.

Embodiments further may be used to optimize handling of certain read miss flows. As an example, state for a snoop filter entry can be updated at a later (deeper) pipeline stage of the cache pipeline, such that the overhead handling this snoop filter update through other portions of the pipeline can be avoided and the update can occur with reduced latency.

Figure 6:
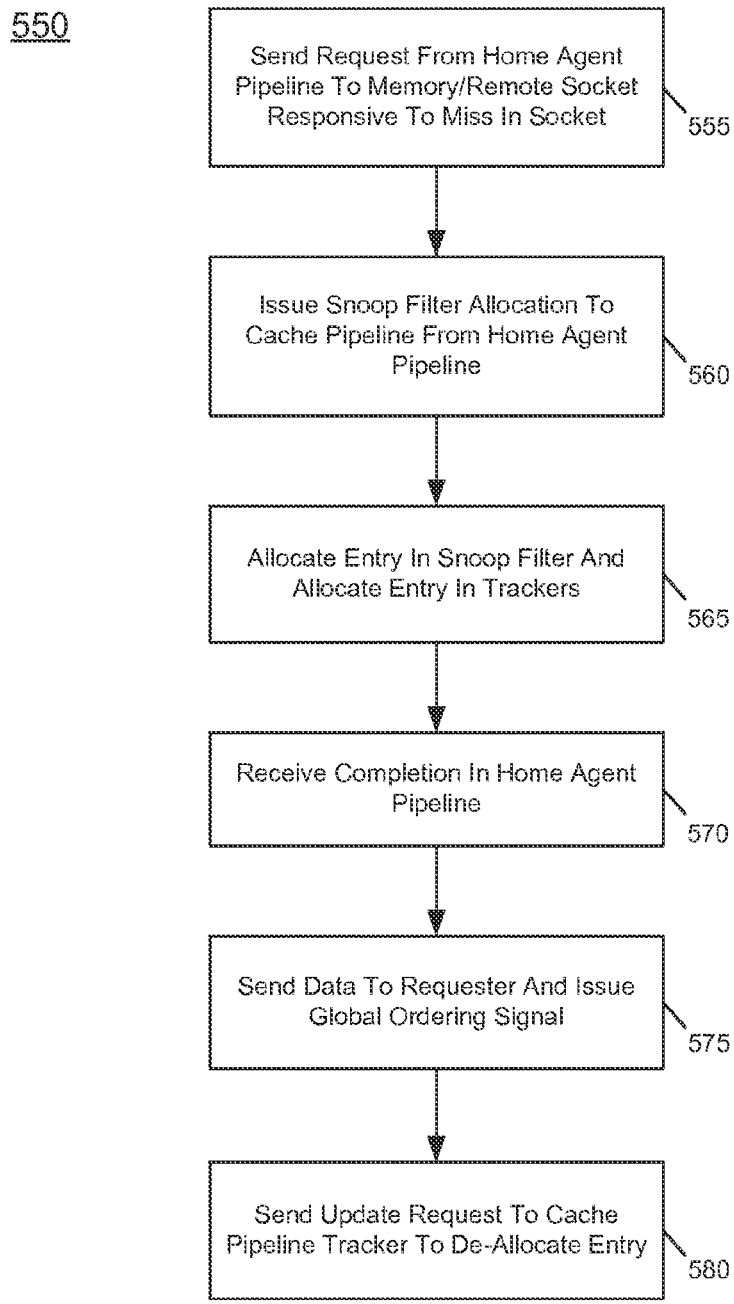
FIG. 6 is a flow diagram of a method for optimizing processing in a caching home agent in accordance with yet another embodiment of the present invention.

Referring now to FIG. 6, shown is a flow diagram of a method for optimizing processing in a CHA in accordance with another embodiment of the present invention. As shown in FIG. 6, method 550 may begin by sending a request to a memory and/or one or more remote sockets responsive to a miss for requested data (e.g., read data) in the socket (block 555). This request may be sent via the home agent pipeline. Next at block 560 a snoop filter allocation may be issued to the cache pipeline from the home agent pipeline (block 560). This issuance may cause the cache pipeline to allocate an entry in the corresponding snoop filter for this request. Note that in an embodiment, if no available entries are present in the snoop filter, an invalid entry may be selected for the allocation. Thus responsive to this request, the cache pipeline allocates an entry in the corresponding snoop filter (block 565). As seen further at block 565, an entry also may be allocated within a tracker of the home agent pipeline and the caching agent pipeline for this request.

Still with reference to FIG. 6, at a later time, a completion is received in the home agent pipeline for this request (block 570). At block 575, the home agent sends the data to the requester (e.g., to a requesting core, and more specifically to an L2 cache of the core).

Note further at block 575, a global ordering signal also may be issued from the home agent pipeline. As discussed above with regard to the operations of FIG. 4, this global ordering signal may be sent to the cache. In addition, a direct GO signal may be sent from the home agent pipeline to the cache pipeline, as also discussed in FIG. 4. Next at block 580, a tracker update request may be sent to the snoop filter to enable the caching pipeline to deallocate the corresponding entry in the tracker of the cache pipeline based on the completion message. Note that the deallocation may, in an embodiment, be implemented by invalidating the corresponding entry of the tracker, such that the entry is available to be reallocated to another request.

Note that this tracker update request may be sent by way of a bypass path coupled between the home agent pipeline and the caching pipeline (as shown in FIG. 3). More specifically, this bypass path may cause the signal to be sent deep into the cache pipeline so that this signal need not traverse the entire pipeline, reducing latency and power consumption. As such, embodiments enable updating of snoop filter state information late in the pipeline on a miss for a no victim case, which may optimize read miss flows. Understand while shown at this high level in the embodiment of FIG. 6, many variations and alternatives are possible.

Although the scope of the present invention is not limited in this regard, in an embodiment a micro-architecture of the CHA may be configured to perform an every-other-clock access rate to the cache pipeline to leverage various area and timing simplifications. By offloading certain operations that otherwise would be performed in this pipeline to the home agent pipeline, along with optimizing certain flows to minimize the number of traversals of the cache pipeline, reduced latencies and reduced power consumption can be realized. Embodiments may be particularly applicable to adoption in processors including a non-inclusive cache hierarchy in which information present in certain lower level caches (e.g., level 1 and level 2 caches) is not duplicated in a LLC. This is the case, as with such non-inclusive cache hierarchy, increased communications occur for migrations between snoop filter and LLC. Embodiments thus free up cache pipeline bandwidth such that a cache controller having such a pipeline can better handle critical workloads. In addition, by optimizing read modify write flows for state updates and late pipeline updates to the snoop filter, a CHA can be more efficient. As a result, a CHA may maintain given cache coherence protocols with increased bandwidth capabilities.

Optimizations afforded by embodiments of the present invention can improve CHA handling of a wide variety of cache and other memory activities. For example, partial write operations may have substantially optimized flows, both for hits within a snoop filter and hits within an LLC. Similar optimizations may provide improved performance even in the case of LLC/snoop filter misses. Reads of both data and code also may realize optimized handling for snoop filter hits, LLC hits and LLC/snoop filter misses. Optimization as described above may apply to a variety of other cache transactions, including reads for ownership, cache coherency updates (such as invalid to modified), cache line flush operations, clean evictions, and capacity evictions from snoop filter and/or LLC, among others.

Figure 7:
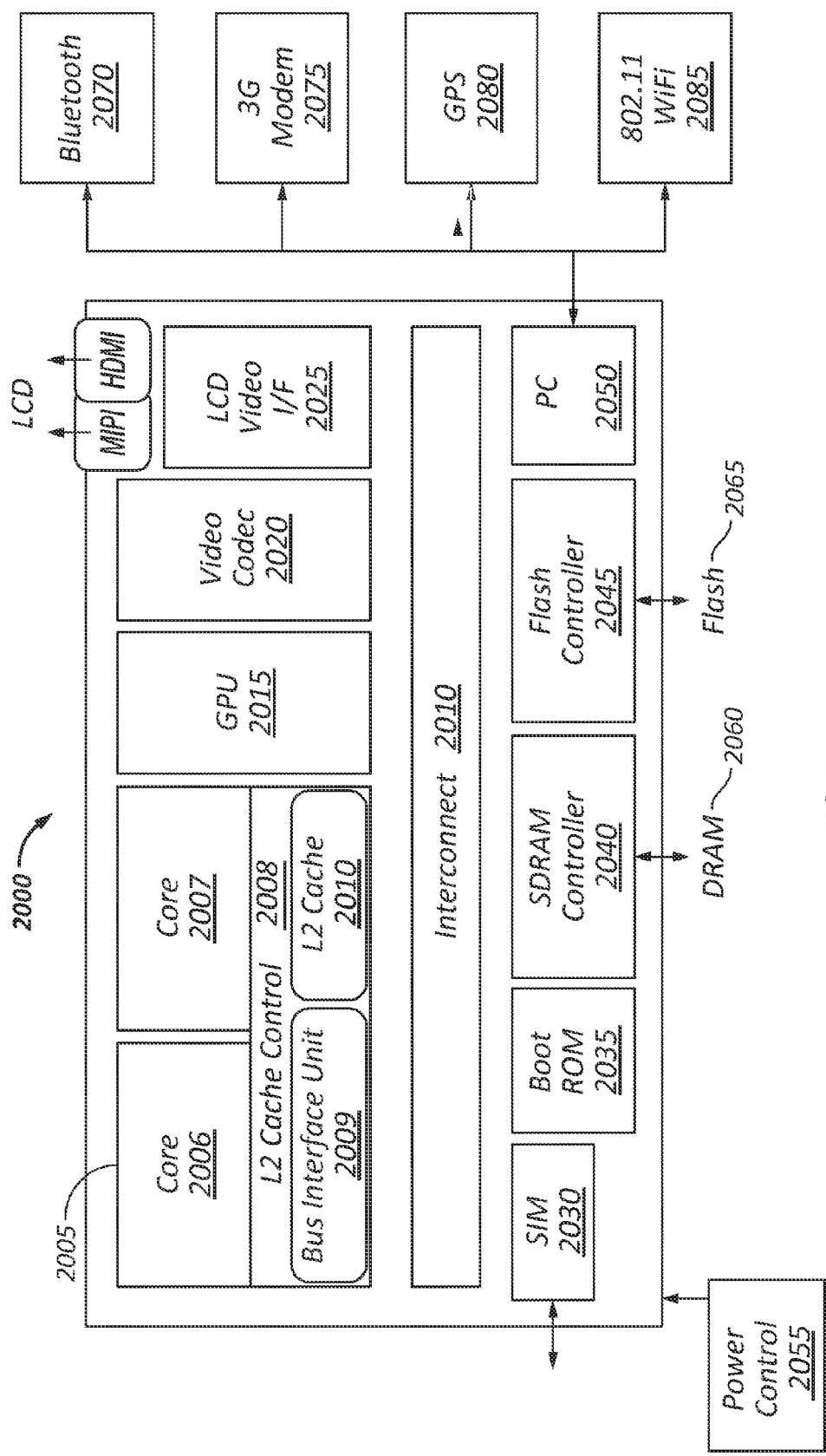
FIG. 7 is an embodiment of a system on-chip design in accordance with an embodiment.

Turning next to FIG. 7, an embodiment of a system on-chip (SOC) design in accordance with an embodiment is depicted. As a specific illustrative example, SOC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2010 includes an on-chip interconnect, such as an IOSF, AMBA, or other interconnect discussed above, which potentially implements one or more aspects described herein.

Interconnect 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects described herein.

In addition, the system illustrates peripherals for communication, such as a Bluetooth module 2070, 3G modem 2075, GPS 2080, and WiFi 2085. Also included in the system is a power controller 2055. Note as stated above, a UE includes a radio for communication. As a result, these peripheral communication modules are not all required. However, in a UE some form a radio for external communication is to be included.

Figure 8:
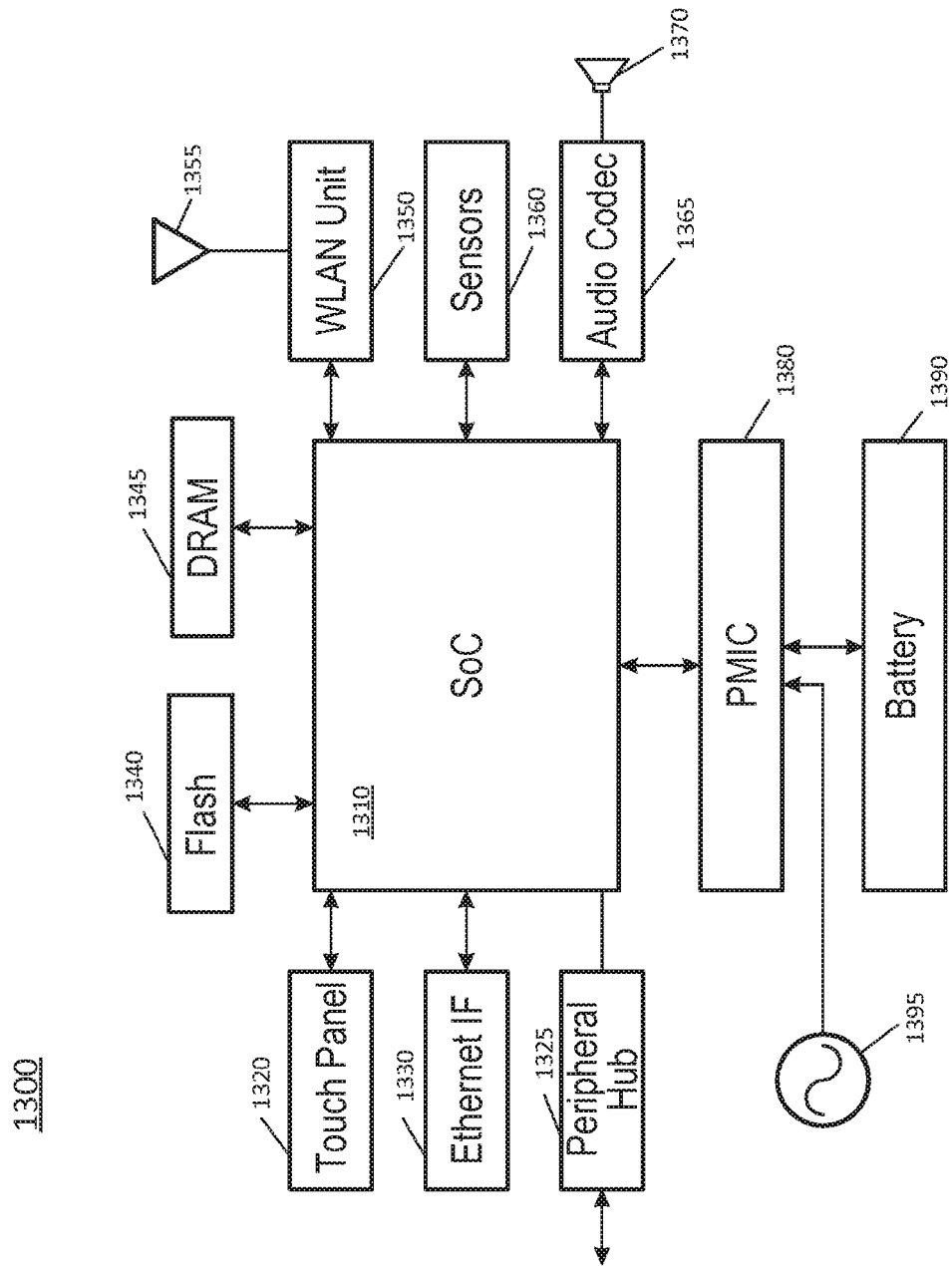
FIG. 8 is a block diagram of an example system with which embodiments may be used.

Referring now to FIG. 8, shown is a block diagram of an example system with which embodiments may be used. In the illustration of FIG. 8, system 1300 may be a mobile low-power system such as a tablet computer, 2:1 tablet, phablet or other convertible or standalone tablet system. As illustrated, a SoC 1310 is present and may be configured to operate as an application processor for the device. SoC 1310 may include a cache memory hierarchy including a LLC controlled by a CHA as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 8, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 8, many variations and alternatives are possible.

Figure 9:
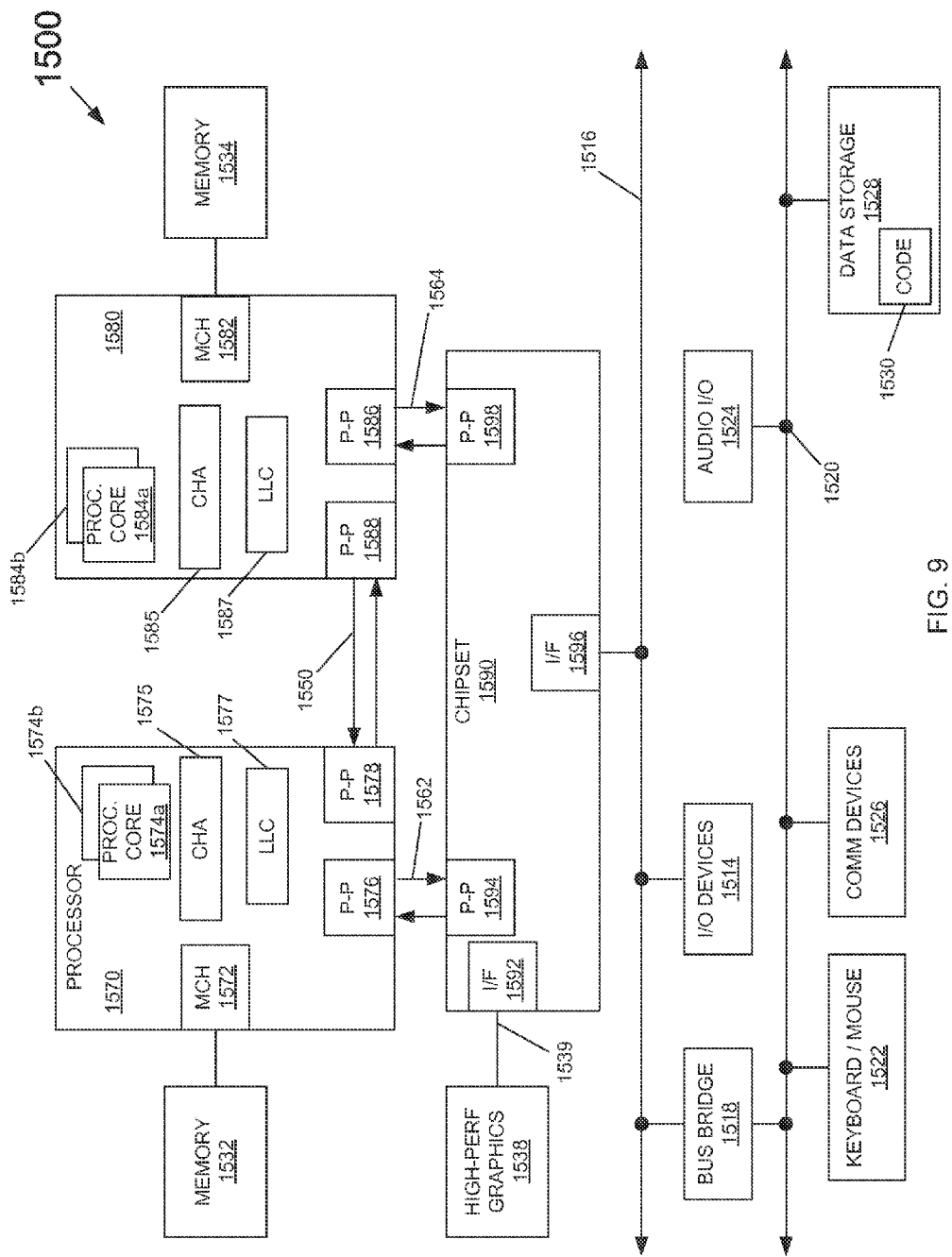
FIG. 9 is a block diagram of a system in accordance with an embodiment of the present invention.

Referring now to FIG. 9, shown is a block diagram of a system in accordance with an embodiment of the present invention. As shown in FIG. 9, multiprocessor system 1500 includes a first processor 1570 and a second processor 1580 coupled via a point-to-point interconnect 1550. As shown in FIG. 9, each of processors 1570 and 1580 may be many core processors including representative first and second processor cores (i.e., processor cores 1574a and 1574b and processor cores 1584a and 1584b). Each processor 1570 and 1580 further may include a CHA 1575 and 1585 coupled to a LLC 1577 and 1587 as described herein, to optimize certain cache memory transaction handling.

Still referring to FIG. 9, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 9, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 9, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 9, various input/output (I/O) devices 1514 may be coupled to first bus 1516, along with a bus bridge 1518 which couples first bus 1516 to a second bus

1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520.

The following examples pertain to further embodiments.

In one example, a processor comprises: at least one core; a cache memory; and a CHA coupled to the at least one core and the cache memory and including a cache controller having a cache pipeline and a home agent having a home agent pipeline. The CHA may be configured to: receive, in the home agent pipeline, information from an external agent responsive to a miss for data in the cache memory; issue a global ordering signal from the home agent pipeline to a requester of the data to inform the requester of receipt of the data; and report issuance of the global ordering signal to the cache pipeline, to prevent the cache pipeline from issuance of a global ordering signal to the requester.

In an example, the cache pipeline is, responsive to the report of issuance of the global ordering signal, to update state information of an entry of a snoop filter associated with the data.

In an example, the home agent pipeline is to receive the information from a remote socket coupled to the processor.

In an example, the information comprises the data, where the data is to be received in a completion message.

In an example, issuance of the global ordering signal from the home agent pipeline is to prevent traversal of the cache pipeline by the completion message.

In an example, the CHA further comprises: an ingress queue coupled to a first interconnect port to store incoming requests including a read request for the data received from the requester; and a staging buffer coupled to the home agent to store pending memory requests and to output the pending memory requests via a second interconnect port coupled to the staging buffer.

In an example, the cache controller is, responsive to a hit in the cache memory for second data, to read and update a coherence state of a line of the cache memory associated with the second data, in a single traversal of the cache pipeline.

In an example, the cache controller is to receive an indication that the at least one core evicted a clean line from a private cache of the at least one core, and responsive to the indication, read and modify a state of an entry of a snoop filter associated with the clean line in a single traversal of the cache pipeline.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: responsive to a hit in a line of a cache memory of a processor, sending data of the line to a requester; and reading and modifying a coherency state of the line to indicate provision of the line to the requester, in a single traversal of a cache pipeline of a CHA of the processor, the CHA including a cache controller having the cache pipeline and a home agent having a home agent pipeline.

In an example, the method further comprises: receiving an indication that a core of the processor evicted a clean line from a private cache of the core; and responsive to the indication, reading and modifying a state of an entry of a snoop filter associated with the clean line in a single traversal of the cache pipeline.

In an example, the cache memory comprises a last level cache that is non-inclusive with the private cache.

In an example, modifying the state of the snoop filter entry comprises invalidating the snoop filter entry.

In an example, the method further comprises: responsive to a miss for data, via the cache pipeline, inserting an entry for the data in a snoop filter and a tracker, and associating a state of the snoop filter with a cache coherency state associated with a request type for the data, before the data is received in the processor; receiving a de-allocation message from the home agent pipeline responsive to receipt in the home agent pipeline of a completion message including the data; and responsive to the de-allocation message, de-allocating the entry of the tracker associated with the data.

In an example, the method further comprises sending the de-allocation message from the home agent pipeline to the cache pipeline via a bypass path, to bypass at least a portion of the cache pipeline.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor having: a core to execute instructions; and an integrated CHA coupled to the core to interface the core to a cache memory and a system memory coupled to the processor. In an example, the integrated CHA includes: a caching agent including a cache pipeline to receive an incoming request and to determine if data requested by the incoming request is present in a location in the cache memory and if not to send the incoming request to a home agent, where if the requested data is present in the location in the cache memory, the cache pipeline is to read and modify a cache coherency state of the location in a single traversal of the cache pipeline; and the home agent including a home agent pipeline to reserve an entry for the incoming request in a tracker and send a memory request to the system memory to request data associated with the incoming request. The system may further include the system memory coupled to the processor.

In an example, the caching agent is to, responsive to a hit in a line of the cache memory, send stored data of the line to a requester, and read and modify a coherency state of the line to indicate provision of the line to the requester, in a single traversal of the cache pipeline.

In an example, the caching agent is to receive an indication that the core evicted a clean line from a private cache of the core, and responsive to the indication, read and modify a state of an entry of a snoop filter associated with the clean line in a single traversal of the cache pipeline.

In an example, the caching agent is to modify the state of the snoop filter entry to an invalid state.

In an example, the home agent is to receive, in the home agent pipeline, information from the system memory responsive to the memory request, issue a global ordering signal directly from the home agent pipeline to a requester of the data to inform the requester of receipt of the data, and report issuance of the global ordering signal to the cache pipeline, to prevent the cache pipeline from issuance of a global ordering signal to the requester.

In an example, the integrated CHA further comprises: an ingress queue coupled to a first interconnect port to store incoming requests; and a staging buffer coupled to the home agent and the caching agent to store pending memory requests and to output the pending memory requests via a second interconnect port coupled to the staging buffer.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core;
   a cache memory; and
   a caching home agent (CHA) coupled to the at least one core and the cache memory and including a cache controller having a cache pipeline and a home agent having a home agent pipeline, the CHA to:
      receive, in the home agent pipeline, information from an external agent responsive to a miss for data in the cache memory;
      issue a global ordering signal from the home agent pipeline to a requester of the data to inform the requester of receipt of the data; and
      report issuance of the global ordering signal to the cache pipeline, to prevent the cache pipeline from issuance of another global ordering signal to the requester.

2. The processor of claim 1, wherein the cache pipeline is, responsive to the report of issuance of the global ordering signal, to update state information of an entry of a snoop filter associated with the data.

3. The processor of claim 1, wherein the home agent pipeline is to receive the information from a remote socket coupled to the processor.

4. The processor of claim 3, wherein the information comprises the data, wherein the data is to be received in a completion message.

5. The processor of claim 4, wherein issuance of the global ordering signal from the home agent pipeline is to prevent traversal of the cache pipeline by the completion message.

6. The processor of claim 1, wherein the CHA further comprises:
   an ingress queue coupled to a first interconnect port to store incoming requests including a read request for the data received from the requester; and
   a staging buffer coupled to the home agent to store pending memory requests and to output the pending memory requests via a second interconnect port coupled to the staging buffer.

7. The processor of claim 1, wherein the cache controller is, responsive to a hit in the cache memory for second data, to read and update a coherence state of a line of the cache memory associated with the second data, in a single traversal of the cache pipeline.

8. The processor of claim 1, wherein the cache controller is to receive an indication that the at least one core evicted a clean line from a private cache of the at least one core, and responsive to the indication, read and modify a state of an entry of a snoop filter associated with the clean line in a single traversal of the cache pipeline.

9. A non-transitory machine-readable medium having stored thereon instructions, which if performed by a machine cause the machine to perform a method comprising:
   responsive to a hit in a line of a cache memory of a processor, sending data of the line to a requester; and
   reading and modifying a coherency state of the line to indicate provision of the line to the requester, in a single traversal of a cache pipeline of a caching home agent (CHA) of the processor, the CHA including a cache controller having the cache pipeline and a home agent having a home agent pipeline.

10. The non-transitory machine-readable medium of claim 9, wherein the method further comprises:
   receiving an indication that a core of the processor evicted a clean line from a private cache of the core; and
   responsive to the indication, reading and modifying a state of an entry of a snoop filter associated with the clean line in a single traversal of the cache pipeline.

11. The non-transitory machine-readable medium of claim 10, wherein the cache memory comprises a last level cache that is non-inclusive with the private cache.

12. The non-transitory machine-readable medium of claim 10, wherein modifying the state of the snoop filter entry comprises invalidating the snoop filter entry.

13. The non-transitory machine-readable medium of claim 9, wherein the method further comprises:
   responsive to a miss for data, via the cache pipeline, inserting an entry for the data in a snoop filter and a tracker, and associating a state of the snoop filter with a cache coherency state associated with a request type for the data, before the data is received in the processor;
   receiving a de-allocation message from the home agent pipeline responsive to receipt in the home agent pipeline of a completion message including the data;

responsive to the de-allocation message, de-allocating the entry of the tracker associated with the data.

14. The non-transitory machine-readable medium of claim 13, wherein the method further comprises sending the de-allocation message from the home agent pipeline to the cache pipeline via a bypass path, to bypass at least a portion of the cache pipeline.

15. A system comprising:
 a processor comprising:
  a core to execute instructions; and
  an integrated caching home agent (CHA) coupled to the core to interface the core to a cache memory and a system memory coupled to the processor, the integrated CHA including:
   a caching agent including a cache pipeline to receive an incoming request and to determine if data requested by the incoming request is present in a location in the cache memory and if not to send the incoming request to a home agent, wherein if the requested data is present in the location in the cache memory, the cache pipeline is to read and modify a cache coherency state of the location in a single traversal of the cache pipeline; and
   the home agent including a home agent pipeline to reserve an entry for the incoming request in a tracker and send a memory request to the system memory to request data associated with the incoming request; and
 the system memory coupled to the processor.

16. The system of claim 15, wherein the caching agent is to, responsive to a hit in a line of the cache memory, send stored data of the line to a requester, and read and modify a coherency state of the line to indicate provision of the line to the requester, in a single traversal of the cache pipeline.

17. The system of claim 15, wherein the caching agent is to receive an indication that the core evicted a clean line from a private cache of the core, and responsive to the indication, read and modify a state of an entry of a snoop filter associated with the clean line in a single traversal of the cache pipeline.

18. The system of claim 17, wherein the caching agent is to modify the state of the snoop filter entry to an invalid state.

19. The system of claim 15, wherein the home agent is to receive, in the home agent pipeline, information from the system memory responsive to the memory request, issue a global ordering signal directly from the home agent pipeline to a requester of the data to inform the requester of receipt of the data, and report issuance of the global ordering signal to the cache pipeline, to prevent the cache pipeline from issuance of a global ordering signal to the requester.

20. The system of claim 15, wherein the integrated CHA further comprises:
 an ingress queue coupled to a first interconnect port to store incoming requests; and
 a staging buffer coupled to the home agent and the caching agent to store pending memory requests and to output the pending memory requests via a second interconnect port coupled to the staging buffer.

* * * * *